Oct. 6, 1942.                H. BANY                2,298,026
                          CONTROL SYSTEM
                        Filed July 15, 1941
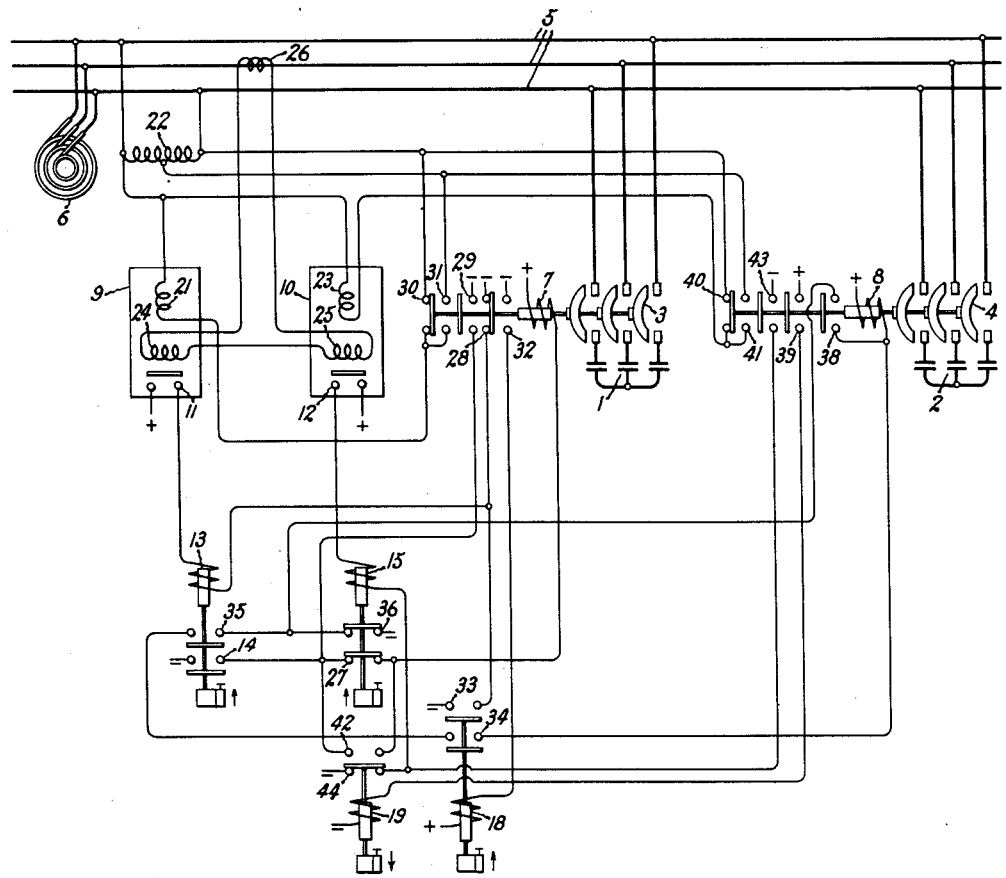
Inventor:
Herman Bany,
by Harry E. Dunham
His Attorney.

Patented Oct. 6, 1942

2,298,026

UNITED STATES PATENT OFFICE 2,298,026

CONTROL SYSTEM

Herman Bany, Lansdowne, Pa., assignor to General Electric Company, a corporation of New York Application July 15, 1941, Serial No. 402,492

14 Claims. (Cl. 172—246)

My invention relates to control systems and particularly to a system for controlling the connections between an electric circuit and a plurality of regulating devices which, when connected to the circuit, control a predetermined electrical quantity thereof. My invention is particularly adapted for use in controlling the connections between an alternating current circuit and a plurality of reactive means of different capacities so as to maintain the power-factor of the circuit within predetermined limits. Sometimes it is desirable to control the power-factor of an alternating current circuit by connecting thereto capacitor units of different capacity such for example as capacitor units of 150 kva. and 300 kva., respectively. In order to control the connections of such capacitors with a minimum amount of switching apparatus and without producing pumping of the switching means, this can be done for example by causing the 150 kva. unit to be connected in service when the reactive component of the load exceeds 85 lagging kva. and to be disconnected from service when the reactive component of the load exceeds 85 leading kva. and by causing the 300 kva. unit to be connected in service when the reactive component of the load exceeds 175 lagging kva. and to be disconnected from service when the reactive component of the load exceeds 175 leading kva. Heretofore in order to effect the proper connections and disconnections of the capacitor units at such values of reactive kva., it has been necessary to provide one set of reactive kva. responsive means for each size of capacitor unit used.

One object of my invention is to provide an improved arrangement of apparatus for controlling the connection between an electric circuit and a plurality of regulating devices which, when connected to the circuit, control a predetermined electrical quantity thereof whereby a single device, which is responsive to the electrical quantity being controlled, effects the respective operation of different regulating devices in response to different values of the electrical quantity being controlled.

Another object of my invention is to provide an improved arrangement of apparatus whereby a single reactive volt-ampere responsive means effects the respective operations of two different capacitor units in response to different predetermined values of the reactive volt-amperes of the load.

My invention will be better understood from the following description when taken in connection with the accompanying drawing, the single figure of which diagrammatically illustrates a system for controlling the connections between a plurality of capacitor units of different capacities and an electric circuit, and the scope of my invention will be pointed out in the appended claims.

Referring to the drawing, 1 and 2 represent two capacitor units of different capacities which are arranged to be connected by circuit breakers 3 and 4 respectively to an electric circuit 5 which is supplied with alternating current from a suitable source 6. As shown, the circuit breakers 3 and 4 are of the well known contactor type which are closed whenever the respective closing coils 7 and 8 are energized. For the purpose of this description, it will be assumed that the capacitor unit 1 has a smaller capacity than the capacitor unit 2.

For automatically controlling the closing of the circuit breakers 3 and 4, I provide a volt-ampere relay 9, and for automatically controlling the opening of the circuit breakers 3 and 4, I provide a volt-ampere relay 10. These volt-ampere relays 9 and 10 are connected to the circuit 5 in any suitable manner, examples of which are well known in the art, so that when both of the circuit breakers 3 and 4 are open, the relay 9 normally closes its contacts 11 when the reactive component of the load being supplied by the source 6 exceeds the predetermined number of lagging volt-amperes at which it is desired to connect the capacitor unit 1 to the circuit 5, and the volt-ampere relay 10 closes its contacts 12 when the reactive component of the load exceeds the predetermined number of leading volt-amperes at which it is desired to disconnect the capacitor unit 1 from the circuit 5. When the volt-ampere relay 9 closes its contacts 11, an energizing circuit is completed for a suitable time relay 13 which, after being energized for a predetermined length of time, closes its contacts 14 and completes an energizing circuit for the closing coil 7 of the circuit breaker 3. The closing of the contacts 12 of the volt-ampere relay 10 completes an energizing circuit for a time relay 15 which, after being energized for a predetermined time, interrupts the energizing circuit of the closing coil 7 of the circuit breaker 3 if it is the only circuit breaker then closed. When the circuit breaker 3 is closed, an energizing circuit is completed for a time relay 18 which, after being energized for a predetermined time, places the closing coil 8 of the circuit breaker 4 under the control of the volt-ampere relays 9 and 10. When the circuit breaker 4 is closed, an energizing circuit is completed for a control relay 19 which is of the type that remains in its energized position for a predetermined time after it is deenergized. The relay 19 controls the energizing circuit of the time relay 15 so that it is prevented from being reenergized for a predetermined time after the circuit breaker 4 opens.

Since the capacitor unit 2 is assumed to be of a greater capacity than the unit 1, fixed settings of the relays 9 and 10, which would effect the closing and opening of the circuit breaker 3 at the proper values of reactive volt-amperes in the circuit 5 to maintain substantially unity power factor without causing pumping, would cause pumping if these relays with the same settings controlled the closing and opening of the circuit breaker 4. For example, if we assume that the capacitor units 1 and 2 are of 150 kva. and 300 kva. capacities, respectively, and that the relays 9 and 10 are respectively set to close their contacts in response to 85 lagging kva. and 85 leading kva., the connection of the 150 kva. unit 1, in response to the relay 9 closing its contacts 10, due to the reactive component of the load increasing above 85 lagging kva., causes the reactive kva. component of the load to become approximately 65 leading kva., and therefore does not cause the relay 10 to close its contacts 12 and effect the opening of the circuit breaker 3. Similarly the disconnection of the 150 kva. unit 1, in response to the relay 10 closing its contacts 12, due to the reactive component of the load increasing above 85 leading kva., causes the reactive kva. component of the load to become approximately 65 lagging kva., and therefore does not cause the relay 9 to close its contacts 11 and effect the closing of the circuit breaker 3. However, the connection of the 300 kva. unit 2, in response to the relay closing its contacts 11 due to the reactive component of the load exceeding 85 lagging kva., would cause the reactive kva. component of the load to become approximately 215 leading kva. Therefore, under these operating conditions, the relay 10 would immediately close its contacts 12 and after a time delay, would effect the opening of the circuit breaker 4 so as to disconnect the capacitor unit 2 from the circuit 5. The disconnection of the capacitor unit 2 would then cause the reactive component of the load to be sufficiently lagging to cause the relay 9 to again close its contacts 11 and effect a reclosure of the circuit breaker 4. Pumping of the circuit breaker 4, therefore, would result with such fixed settings of the volt-ampere relays 9 and 10.

Fixed settings of the relays 9 and 10 which would effect the closing and opening of the circuit breaker 2 at the proper values of reactive volt-amperes in the circuit 5 to prevent such pumping would result in an arrangement which would not take full advantage of the corrective function of the smaller capacitor unit 1 because it would be necessary to wait until the reactive volt-amperes had reached too large a value before the smaller capacitor unit 1 is placed in service.

In order to overcome these difficulties which result from fixed settings of the relays 9 and 10, I provide an arrangement for changing the setting of the relay 9, namely the responsiveness of the relay 9 to a predetermined value of reactive volt-amperes supplied by the source 6 to the circuit 5 and the capacitor units connected thereto, when the circuit breaker 3 closes and for changing the setting of the relay 10 when the circuit breaker 4 closes so that a larger value of lagging volt-amperes is required to cause the relay 9 to close its contacts 11 when the circuit breaker 3 is closed than is required when the circuit breaker 3 is opened and so that a larger value of leading volt-amperes is required to cause the relay 10 to close its contacts 12 when the circuit breaker 4 is closed than it is required when the circuit breaker 4 is open. In the particular embodiment of my invention shown in the drawing, I change the settings of the respective volt-ampere relays by changing the voltages applied to the voltage windings thereof. As shown, the voltage winding 21 of the volt-ampere relay 9 is arranged to be connected to the high voltage secondary terminals of an autotransformer 22 when the circuit breaker 3 is open and to the low voltage secondary windings of the autotransformer 22 when the circuit breaker 3 is closed. Similarly the voltage winding 23 of the volt-ampere relay 10 is connected to the high voltage secondary terminals of the autotransformer 22 when the circuit breaker 4 is open and to the low voltage secondary terminals of the autotransformer 22 when the circuit breaker 4 is closed. The primary winding of the autotransformer 22 is connected across one phase of the circuit 5. The current windings 24 and 25 of the volt-ampere relays 9 and 10, respectively, are shown connected in series with the secondary winding of a current transformer 26, the primary winding of which is connected in series with one of the line conductors of the circuit 5.

The operation of the arrangement shown in the drawing is as follows:

When both of the circuit breakers 3 and 4 are open and the reactive volt-amperes in the circuit 5 exceed the predetermined lagging value for which the relay 9 is normally calibrated, this relay closes its contacts 11 and completes, through the auxiliary contacts 28 on the circuit breaker 3, an energizing circuit for the time relay 13. After being energized for a predetermined time, the relay 13 closes its contacts 14 and completes, through the contacts 27 of the time relay 15, an energizing circuit for the closing coil 7 of the circuit breaker 3 so that the circuit breaker is closed to connect the capacitor unit 1 to the circuit 5. The connection of the capacitor unit 1 decreases the lagging volt-amperes in the circuit 5 sufficiently to cause the relay 9 to open its contacts 11. The opening of the auxiliary contacts 28 on the circuit breaker 3 effects the deenergization of the time relay 13 which in turn opens, at its contacts 14, the initial energizing circuit for the closing coil 7. The closing of the auxiliary contacts 29 of the circuit breaker 3, however, completes a shunt circuit around the contacts 14 of the relay 13 so that the closing coil 7 remains energized after the relay 13 opens its contacts 14. By opening its auxiliary contacts 30 and closing its auxiliary contacts 31, the circuit breaker 3 changes the voltage applied to the voltage winding 21 of the volt-ampere relay 9 so that a larger number of lagging volt amperes is required in the circuit 5 to cause the relay 9 to close its contacts 11 after the circuit breaker 3 is closed than is required when the circuit breaker 3 is open. The closing of the auxiliary contacts 32 on the circuit breaker 3 completes an energizing circuit for the time relay 18 which closes its contacts 33 and 34 after the circuit breaker 3 has remained closed for a predetermined time.

If, after the circuit breaker 3 is closed, the load connected to the circuit 5 changes so that the reactive volt-amperes thereof increase to a sufficient lagging value to cause the relay 9 to close its contacts 11, a circuit is then completed for the time relay 13 through the contacts 33 of the energized time relay 18. The closing of the contacts 35 of the time relay 13 completes an energizing circuit for the closing coil 8 of the circuit breaker 4 through the contacts 34 of the energized time relay 18 and the contacts 36 of the deenergized time relay 15 so that the circuit breaker 4 is closed to connect the capacitor unit 2 to the circuit 5. The closing of the auxiliary contacts 38 on the circuit breaker 4 completes a shunt circuit around the contacts 34 and 35 in the energizing circuit of the closing coil 8 so that the circuit breaker 4 is not opened by the subsequent deenergization of the time relay 13. The closing of the auxiliary contacts 39 on the circuit breaker 4 completes an energizing circuit for the control relay 19 which in turn closes its contacts 42 to complete a shunt circuit around the contacts 21 of the time relay 15. The connection of the capacitor unit 2 decreases the number of lagging volt-amperes in the circuit 5 sufficiently to cause the relay 9 to open its contacts 12 and thereby effect the deenergization of the time relay 13. By opening its auxiliary contacts 40 and closing its auxiliary contacts 41, the circuit breaker 4 changes the voltage applied to the voltage winding 23 of the volt-ampere relay 10 so that a larger number of leading volt-amperes is required in the circuit 5 to cause the relay 10 to close its contacts than is required while the circuit breaker 4 is open.

It will now be assumed that, while both of the circuit breakers 3 and 4 are closed, a sufficient number of leading volt-amperes occur in the circuit 5 to cause the relay 10 to close its contacts 12 so that an energizing circuit is completed for the time relay 15 through the auxiliary contacts 43 on the closed circuit breaker 4. After being energized for a predetermined time, the time relay 15 opens its contacts 36 and interrupts the holding circuit for the closing coil 8 so that the circuit breaker 4 opens and disconnects the capacitor unit 2 from the circuit 5. The disconnection of the capacitor unit 2 decreases the number of leading volt-amperes in the circuit 5 sufficiently to cause the relay 10 to open its contacts 12 and effect the deenergization of the time relay 15 even though the opening of the auxiliary contacts 41 and the closing of the auxiliary contacts 40 on the circuit breaker 4 restore the normal setting of the relay 10. A predetermined time after the circuit breaker 4 opens its auxiliary contacts 39, the time relay 19 opens its contacts 42 and closes its contacts 44.

If, while only the circuit breaker 3 is closed, the reactive volt-amperes in the circuit 5 exceed the predetermined leading value for which the relay 10 is normally set, this relay closes its contacts 12 and completes an energizing circuit for the time relay 15 through the contacts 44 of the control relay 19. After being energized for a predetermined time, the time relay 15 opens its contacts 29 and interrupts the holding circuit of the closing coil 7 so that the circuit breaker 3 is opened to disconnect the capacitor unit 1 from the circuit breaker 5. By opening its auxiliary contacts 31 and closing its auxiliary contacts 30, the circuit breaker 3 changes the connections of the voltage winding 21 of the relay 9 so that the setting thereof is restored to its normal value.

While I have in accordance with the patent statutes shown and described my invention as applied to a particular system and as embodying various devices diagrammatically indicated, changes and modifications will be obvious to those skilled in the art and I therefore aim in the appended claims to cover all such changes and modifications as fall within the true spirit and scope of my invention.

What I claim as new and desire to secure by Letters Patent of the United States, is:

1. In combination, an electric circuit, a plurality of regulating devices arranged when connected to said circuit to control a predetermined electric quantity supplied to said circuit and the regulating devices connected thereto, switching means for respectively controlling the connections of said regulating devices to said circuit, means including a control device responsive to a predetermined value of said predetermined electric quantity for effecting a predetermined operation of a predetermined one of said switching means, means for changing the setting of said control device when said predetermined operation of said one of said switching means is effected so that said control device responds to a different predetermined value of said predetermined electric quantity, and means controlled by said control device after the setting thereof has been changed for effecting a predetermined operation of another of said switching means when said different predetermined value of said predetermined electric quantity occurs in said circuit.

2. In combination, an electric circuit, a plurality of regulating devices of different capacities arranged when connected to said circuit to control a predetermined electric quantity supplied to said circuit and the regulating devices connected thereto, switching means for respectively connecting said regulating devices to said circuit, means including a control device responsive to a predetermined value of said predetermined electric quantity for effecting the operation of a predetermined one of said switching means, means responsive to said operation of said one of said switching means for changing the setting of said control device so that it responds to a different predetermined value of said predetermined electric quantity, and means controlled by said control device after the setting thereof has been changed for effecting the operation of another of said switching means when said different predetermined value of said predetermined electric quantity occurs in said circuit.

3. In combination, an electric circuit, a plurality of reactive devices, switching means for respectively connecting said reactive devices to said circuit, means including a control device responsive to a predetermined magnitude of the reactive component of the power supplied to said circuit and the reactive devices connected thereto for effecting the operation of a predetermined one of said switching means, means responsive to said operation of said one of said switching means for changing the setting of said control device so that it responds to a different predetermined magnitude of the reactive component of the power supplied to said circuit and the reactive devices connected thereto, and means controlled by said control device after the setting thereof has been changed for effecting the operation of another of said switching means when said different predetermined magnitude of the reactive component of power is supplied to said circuit and the reactive devices connected thereto.

4. In combination, an electric circuit, two capacitor units of different capacities, switching means for respectively connecting said units to said circuit, means including a volt-ampere responsive relay normally responsive to a predetermined number of lagging volt-amperes supplied to said circuit for effecting the operation of the switching means associated with the smaller capacitor unit, means responsive to said operation of said last mentioned switching means for changing the setting of said relay so that it responds to a predetermined larger number of lagging volt-amperes supplied to said circuit and said smaller capacitor unit, and means controlled by said relay for effecting the operation of the switching means associated with the larger capacitor unit when said predetermined larger number of reactive volt-amperes is supplied to said circuit and said smaller capacitor unit.

5. In combination, an electric circuit, a plurality of regulating devices of different capacities arranged when connected to said circuit to control a predetermined electric quantity supplied to said circuit and the regulating devices connected thereto, switching means respectively connecting said devices to said circuit, means including a control device responsive to a predetermined value of said electric quantity for effecting the operation of a predetermined one of said switching means to disconnect the associated regulating device from said circuit, means responsive to said operation of said one of said switching means for changing the setting of said control device so that it responds to a different predetermined value of said electric quantity, and means controlled by said control device after the setting thereof has been changed for effecting the operation of another of said switching means to disconnect the associated regulating device from said circuit when said different predetermined value of said predetermined electric quantity occurs in said circuit.

6. In combination, an electric circuit, a plurality of reactive devices of different capacities, switching means respectively connecting said devices to said circuit, means including a control device responsive to a predetermined magnitude of the reactive component of the power supplied to said circuit and the reactive devices connected thereto for effecting the operation of a predetermined one of said switching means to disconnect the associated reactive device from said circuit, means responsive to said operation of said one of said switching means for changing the setting of said control device so that it responds to a different predetermined magnitude of the reactive component of the power supplied to said circuit and the reactive devices connected thereto, and means controlled by said control device after the setting thereof has been changed for effecting the operation of another of said switching means to disconnect the associated regulating device from said circuit when said different predetermined magnitude of the reactive component of power is supplied to said circuit and the reactive devices connected thereto.

7. In combination, an electric circuit, two capacitor units of different capacities, switching means respectively connecting said units to said circuit, means including a volt-ampere responsive relay responsive to a predetermined number of leading volt-amperes supplied to said circuit and the capacitor units connected thereto for effecting the operation of the switching means associated with the larger capacitor unit to disconnect said larger capacitor unit from said circuit, means responsive to said operation of said last mentioned switching means for changing the setting of said relay so that it responds to a smaller number of leading volt-amperes supplied to said circuit and said smaller capacitor unit, and means controlled by said relay after the setting thereof has been changed for effecting the operation of the switching means associated with the smaller capacitor unit to effect the disconnection thereof from said circuit when said smaller number of leading volt-amperes are supplied to said circuit and said smaller capacitor unit.

8. In combination, an electric circuit, two capacitor units of different capacities, arranged when connected to said circuit to control a predetermined electric quantity supplied to said circuit and the capacitor units connected thereto, switching means respectively controlling the connections between said units and said circuit, means including a control device responsive to a predetermined value of said predetermined electric quantity for effecting a predetermined operation of a predetermined one of said switching means, means for changing the setting of said control device when said predetermined operation of said one of said switching means is effected so that said control device responds to a different predetermined value of said predetermined electric quantity, and means controlled by said control device after the setting thereof has been changed for effecting a predetermined operation of another of said switching means when said different predetermined value of said predetermined electric quantity occurs in said circuit.

9. In combination, an electric circuit, two capacitor units of different capacities, and means including a single volt-ampere responsive device connected to said circuit for effecting the connection of one of said units to said circuit in response to one value of reactive volt-amperes supplied to said circuit and the connection of the other of said units to said circuit in response to a different value of reactive volt-amperes supplied to said circuit and said one of said capacitor units.

10. In combination, an electric circuit, two regulating devices of different capacities arranged when connected to said circuit to control a predetermined electric quantity supplied to said circuit and the regulating devices connected thereto, and means including a single control device responsive to said predetermined electric quantity for effecting the connection of one of said regulating devices to said circuit in response to one value of said electric quantity and the connection of the other of said regulating devices to said circuit in response to a different value of said electric quantity.

11. In combination, an electric circuit, two regulating devices of different capacities arranged when connected to said circuit to control a predetermined electric quantity supplied to said circuit and the regulating devices connected thereto, and means including a single control device responsive to said predetermined electric quantity for controlling the connection between one of said regulating devices and said circuit in a predetermined manner in response to one value of said electric quantity and the connection between the other of said regulating device and said circuit in a predetermined manner in response to a different value of said electric quantity.

12. In combination, an electric circuit, two capacitor units of different capacities, and means including a single volt-ampere responsive device connected to said circuit for controlling the connection between one of said units and said circuit in a predetermined manner in response to one value of reactive volt-amperes supplied to said circuit and the capacitor units connected thereto and the connection between the other of said units and said circuit in a predetermined manner in response to a different value of reactive volt-amperes supplied to said circuit and the capacitor units connected thereto.

13. In combination, an electric circuit, two capacitor units of different capacities connected to said circuit, and means including a single volt-ampere device connected to said circuit for effecting the disconnection of one of said units from said circuit in response to one value of reactive volt-amperes supplied to said circuit and said capacitor units and the disconnection of the other of said units from said circuit in response to a different value of volt-amperes supplied to said circuit and said other of said units.

14. In combination, an electric circuit, two regulating devices of different capacities connected to said circuit and controlling a predetermined electrical quantity supplied to said circuit and the regulating devices connected thereto, and means including a single control device responsive to said predetermined electric quantity for effecting the disconnection of one of said regulating devices from said circuit in response to one value of said electric quantity and the disconnection of the other of said regulating devices from said circuit in response to a different value of said electric quantity.

HERMAN BANY.